(12) United States Patent
Salama

(10) Patent No.: US 6,315,887 B1
(45) Date of Patent: Nov. 13, 2001

(54) DEVICE AND METHOD FOR THE PURIFICATION OF POLLUTED WATER

(76) Inventor: Amir Salama, 600 Robitaille, Granby (CA), J2G 9J6

( * ) Notice: Subject to any disclaimer, the term of this patent is extended or adjusted under 35 U.S.C. 154(b) by 0 days.

(21) Appl. No.: 09/435,348

(22) Filed: Nov. 8, 1999

(51) Int. Cl.⁷ ................................................. C02F 1/461
(52) U.S. Cl. ..................... 205/701; 205/752; 205/756; 204/275.1; 204/277
(58) Field of Search ................... 205/701, 756, 205/752; 204/275.1, 277

(56) References Cited

U.S. PATENT DOCUMENTS

| | | |
|---|---|---|
| 3,816,276 * | 6/1974 | Ichiki et al. ........................ 205/756 |
| 4,189,363 | 2/1980 | Beitzel . |
| 4,676,956 | 6/1987 | Mori . |
| 4,971,687 | 11/1990 | Anderson . |
| 4,992,169 | 2/1991 | Izumiya . |
| 5,124,131 | 6/1992 | Wekhof . |
| 5,154,895 | 10/1992 | Moon . |
| 5,250,177 | 10/1993 | Cho . |
| 5,258,124 | 11/1993 | Bolton et al. . |
| 5,258,165 | 11/1993 | Olsen . |
| 5,262,066 | 11/1993 | Van Soye et al. . |
| 5,266,215 | 11/1993 | Engelhard . |
| 5,685,994 * | 11/1997 | Johnson ............................. 205/756 |
| 5,792,336 * | 8/1998 | Nikolaevsky et al. ............ 205/756 |

FOREIGN PATENT DOCUMENTS

802196 * 2/1981 (SU) ..................................... 205/756

* cited by examiner

Primary Examiner—Arun S. Phasge
(74) Attorney, Agent, or Firm—Robic

(57) ABSTRACT

A device for the purification of polluted water, especially adapted to remove therefrom organic pollutants. The device makes use of a reactor wherein the polluted water is subjected to the combined action of an ozone containing gas in the presence of an oxidation reaction catalyst that is produced in situ by electrolysis. A method of use of this device is also disclosed.

16 Claims, 3 Drawing Sheets

DEVICE AND METHOD FOR THE PURIFICATION OF POLLUTED WATER

FIELD OF THE INVENTION

The present invention relates to a method and a device for the treatment of water. More specifically, it relates to a method and device for the purification of polluted water in order to remove therefrom a large variety of pollutants, especially organic pollutants.

DESCRIPTION OF THE PRIOR ART

To carry out the purification/disinfection of water by complete oxidation of organic compounds it is well known in the art to use ozone ($O_3$). For example, U.S. Pat. Nos. 5,250,177 and 5,154,895 disclose devices for generating ozone electrolysis and for using the so generated ozone for the purification of water. Ozone may also be produced via U.V. light as described in U.S. Pat. Nos. 4,189,363 (Beitzel) and 4,992,169 (Izumiya).

It is also known to enhance the efficiency of an apparatus using U.V. light to destroy microorganisms, by mixing ozone with the water to be purified (see U.S. Pat. No. 5,266,215 (Engelhard)).

In U.S. Pat. No. 5,151,252 (Mass), there is disclosed a photochemical reactor for the treatment of a fluid polluted with photoreactants components. This patent suggest to coat the walls of the reactor in the treatment region with a catalyst in order to increase the rate of secondary reactions that occur with the reaction products produced by the initial photochemical reaction.

However, all devices and methods of the prior art fail to achieve with a sufficient efficiency the treatment of water, especially waste water and more particularly when said waste water is contaminated with a large variety of organic contaminants.

SUMMARY OF THE INVENTION

It is therefore an object of the invention to provide an efficient and economic method for the purification of polluted water, especially waste water, by either oxidation "in situ" of its organic contaminants and/or combination thereof in a physically removal form. This method also permits to kill contaminating living pollutants such bacteria and virus.

It is another object of the invention to provide a device for carrying out the aforesaid method. This device can be used for the purification of polluted water contaminated with a large variety of pollutants such as those found in the effluent of many organic processing plants. Thus, it becomes possible to achieve the treatment of water polluted with organic compounds, especially organic compounds found in the effluent of many polluting industries like petrochemicals, fertilizers, insecticides, pesticides, or in paper mills and food industries, which generally contain high COD and BOD level.

It is a further object of the invention to provide a reactor in which high oxidizing conditions are generated so as to fully or partially break down organic pollutants and transform them into easily removable oxidation products, especially oxidation products having a low density or gas like for example $CO_2$.

Thus, the invention provides a method and a device which permit to purify heavily polluted water. The method and device according to the invention are devised to oxidize the organic contaminants contained in the waste water that is treated and to produce during the treatment at least one catalyst of oxidation reaction in a very activated state.

The device according to the invention is a device for the treatment of water (e.g. the purification of polluted water), comprises:

(a) at least one reactor, said reactor comprising in combination:
   a vessel;
   at least one inlet means for introducing the water to be purified in the vessel;
   at least one outlet means for recovering the treated water from the vessel;
   duct means for introducing an ozone-containing gas inside the vessel; and
   electrochemical means for promoting conversion, inside the reactor, of at least one catalyst precursor into a catalyst of oxidation reaction, said electrochemical means comprising at least one pair of electrodes including a cathode and an anode;
(b) a supply of ozone-containing gas connected to the duct means;
(c) a power supply connected to the electrodes for generating therebetween a difference of potential and thus causing an electrolysis reaction; and
(d) means for removing oxidation products from water after treatment within the vessel.

Preferably, the anode may comprise at least one element, like a bar or a plate, that is made of an electrically conductive material and is located at least in part inside the vessel. More preferably also, the anode is essentially made of at least one catalyst precursor which is selected to become solubilized in the water to be purified during the electrolysis reaction.

The method according to the invention is devised for the purification of pollutants-containing water by oxidation of the pollutants into oxidation products and removal of the oxidation products. This method comprises the steps of (i) introducing the pollutants-containing water into a reactor;
(ii) subjecting said water to a treatment with an ozone-containing gas in the presence of at least one metal catalyst of oxidation reaction, said metal catalyst being generated <<in situ>>; and
(iii) removing the oxidation products from the treated water.

More specifically, the method according to the invention comprises the steps of:

(i) processing the pollutants-containing water in a device as defined hereinabove; and
(ii) removing the oxidation products from the treated water.

For the treatment of heavily contaminated water, it may be efficient to successively carry out the aforesaid steps (i) and (ii) more than one time and then to carry out the additional step of (iii) subjecting the purified phase to filtration, decantation and/or flotation to obtain the purified water.

BRIEF DESCRIPTION OF THE DRAWINGS

The present invention will be better understood upon reading the following non restrictive description of two particularly preferred embodiments of the invention, made with reference to the accompanying drawings wherein.

DETAILED DESCRIPTION OF THE PREFERRED EMBODIMENTS

The device for the treatment of water according to the invention comprises in combination at least one reactor in which are carried out oxidation reactions for the treatment of water to be purified, and at least one means for recovering the purified water from the water treated within the reactor.

Figure 1:
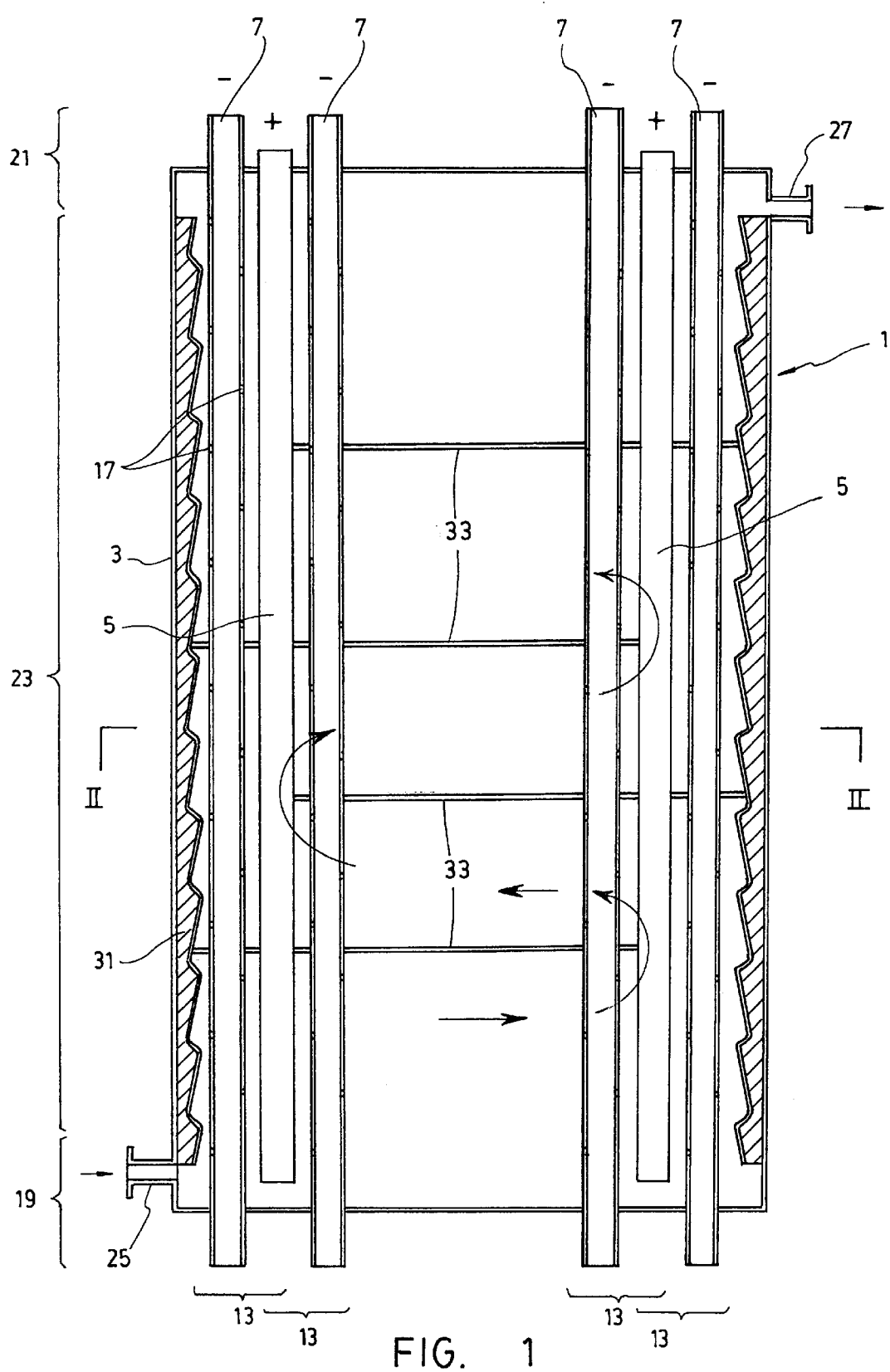
FIG. 1 is a longitudinal cross-sectional view of a reactor for use in a device according to a first preferred embodiment of the invention.
Figure 2:
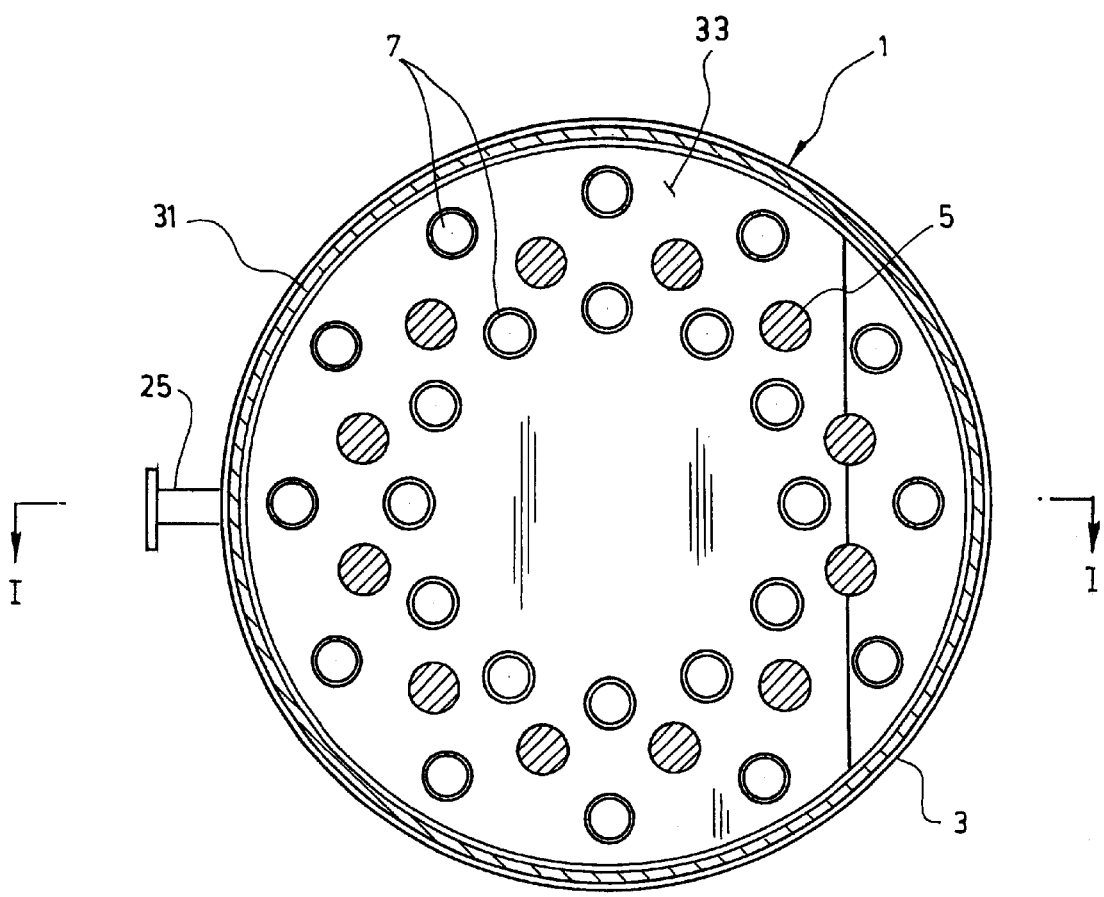
FIG. 2 is a cross-sectional view taken along line II—II of the reactor shown in FIG. 1.

In the embodiment shown in FIGS. 1 and 2, the reactor 1 comprises a vessel 3 which may be of any appropriate size (i.e. from a few inches to several feet) and configuration. However, as shown on FIG. 1, the reactor 1 is preferably in the form of elongated tubular vessel 3 having two opposite ending portions 19 and 21 and an intermediary portion 23. The vessel 3 can be made of any suitable material which can be either metallic or non-metallic inlet means are provided near the end portion 19 of the vessel 3 for introducing the pollutants-containing water to be purified into the vessel. As illustrated on FIGS. 1 and 2, these inlet means may consist of a conduit 25 opening on the outer periphery of the end portion 19 of the vessel 3. At the opposite end portion 21, outlet means are provided for the recovery of the treated water from the vessel 3. As illustrated on FIG. 1, these outlet means may consist of another conduit 27.

The reactor 1 further comprises duct means for introducing an ozone-containing gas inside the vessel 3. These duct means may be made of either metal, graphite, plastic ceramic or a combination thereof. According to a preferred embodiment of the invention, the duct means are made of an electrically conductive material and connected to a power supply to define a cathode.

In the preferred embodiment of the invention shown in FIG. 1, the duct means advantageously consist of supply pipes 7 passing through the vessel 3 and each provided with apertures 17. These supply pipes are assembled in such a way that they can be connected to a supply of the ozone-containing gas (not shown).

The reactor 1 further comprises electrochemical means for promoting the conversion "in situ" of at least one catalyst precursor into an oxidation reaction catalyst. Such electrochemical means may comprise at least one electrolytic cell 13 provided with a cathode and an anode. As aforesaid, in the preferred embodiment illustrated on FIGS.1 and 2, the supply ducts 7 are advantageously made of an electrically conductive material (e.g. metals) and are connected to a power supply to define the cathode.

The anode can be made of either of a soluble or an insoluble material. It preferably consists of bars 5 which are connected to the power supply to define the anode as shown on FIGS. 1 and 2. The anode can be made of different metals such as magnesium, aluminum, titanium, zirconium, palladium, platinum, columbium, vanadium, iron, magnesium, and graphite combinations thereof or alloys containing them.

As better shown in FIG. 2 the bars 5 and supply ducts 7 used as anode and cathode may be provided into the reactor according to a particular arrangement to improve the efficiency of the device. Thus, the bars and supply ducts may respectively be provided on concentric circles as to define at least two (2) and preferably three (3) concentric rows of electrode as is shown in FIG. 2. Advantageously, each electrode is positioned at an equal distance from the neighboring electrodes of the opposite polarity.

Turbulence means may advantageously be generated inside the vessel 3 for redirecting and/or temporary retaining the flow of water to be treated in order to increase the pathway of the pollutants-containing water in the reactor and thereby the duration and efficiency of the treatment. As illustrated on FIG. 1, the turbulence means may comprise corrugations 31 made of an inert material and provided on the internal surface of the vessel 3. The turbulence means may also comprise baffles 33 extending in a perpendicular direction with respect to the general flow direction of water to be treated. As shown on FIGS. 1 and 2, the baffles 31 may consist in successive circular plates.

In addition to the reactor 1, the device according to the invention comprises a power supply (not shown) connected to the electrolytic cells 13 for generating a difference of potential between the anode and cathode. The power supply may be either straight or pulsed D.C., superimposed A.C. on D.C. or temporarily reversed D.C.or AC. The current and voltage have to be sufficient to obtain conversion "in situ" and solubilisation of the oxidation reaction catalyst.

In use, the water to be purified is introduced through the inlet means 25 at the end portion 19 of the vessel 3 under sufficient pressure to allow the water to flow trough the vessel 3. Preferably, a pump is used to provide a continuous flow of the water. The flow rate of the pump is chosen to provide a desired time of residence into the vessel 3. The time of residence is easily determined by those skilled in the art as a function of the rate of ozone fed into the reactor and the tension applied to provide a sufficient treatment of the polluted water. The treated water is then discharged by the outlet means 27.

Figure 3:
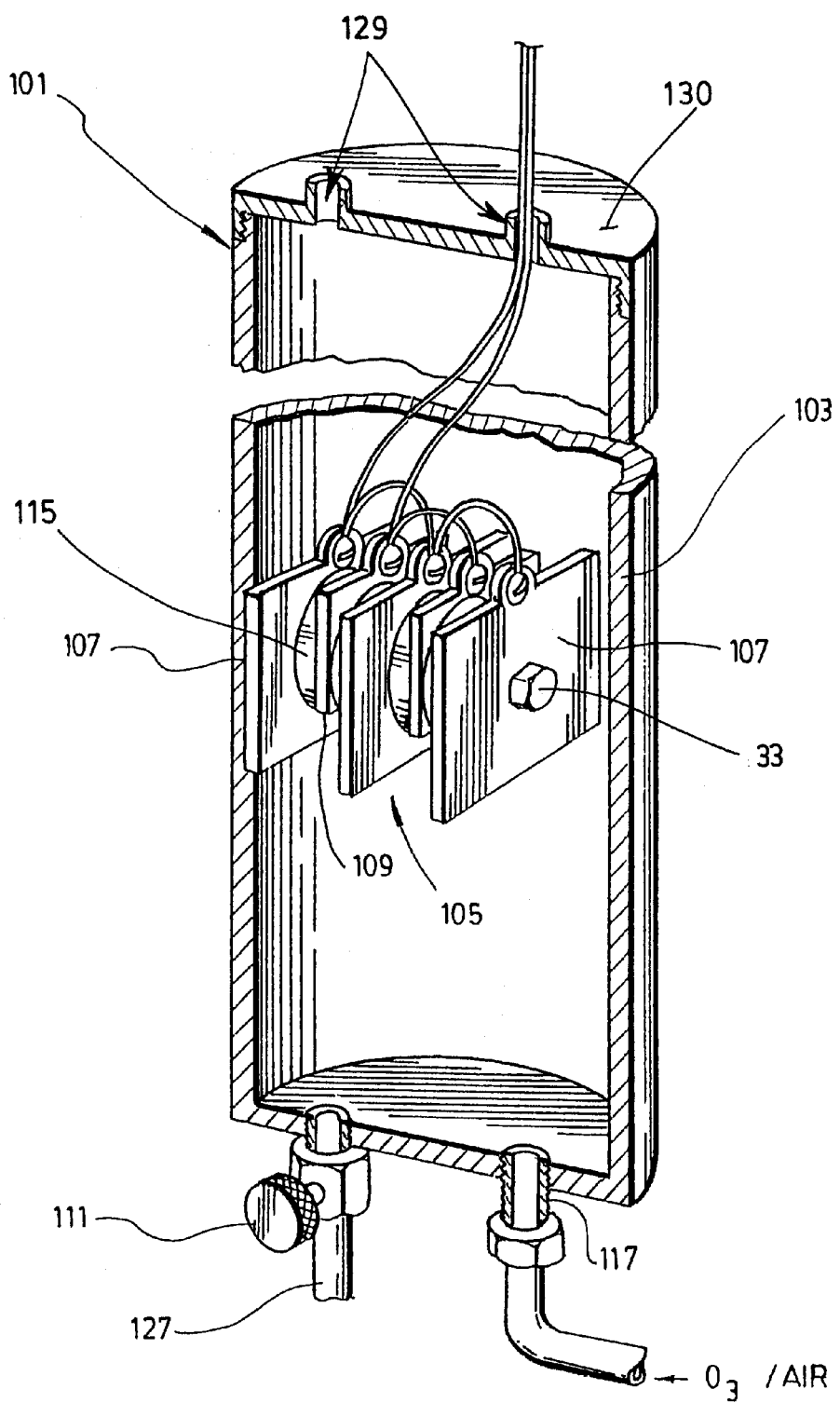
FIG. 3 is a partial, cross-sectional perspective view of a reactor for use in a device according to a second preferred embodiment of the invention.

In the other embodiment shown in FIG. 3, the device according to the invention comprises a reactor 101 comprising a tubular vessel 103 having an upper portion and a lower portion. Water to be purified is fed into the vessel 103 through its upper portion, which may be obturated by a removable cap 130 (i.e. a screw cap). Openings 129 may advantageously be provided into the cap 130 to allow any gas overpressure to exit the vessel 103. The openings 129 also permit the introduction of means for connecting the electrochemical means provided in the vessel 103 to a power supply (not shown). An outlet means 127 is provided at the lower portion of the vessel 103. This outlet means 127 which is closed by a tap 111, allows the recovery of the treated water. Duct means 117 are also provided at the lower portion of the vessel 103 for introducing therein an ozone-containing gas. In the preferred embodiment shown on FIG. 3, the electrochemical means consists of metallic plates 105 alternatively connected to the opposite polarities of a power supply (not shown) so as to define consecutive electrolytic cells. More specifically, plates 107 are connected to define anodes and plates 109 to define cathodes. An isolating element 115 made of any kind of suitable isolating material is provided between two consecutive plates. The electrolytic cells are maintained associated together by means of a bolt 133 passing through the plates 105 and the isolating elements 115.

In use, water to be treated is poured into the reactor 101 and submitted to the action of the ozone-containing gas, which is supplied by the duct means 117, and to the oxidation reaction catalyst produced by the electrolytic cells defined by plates 107 and 109. After a desired period of time of residence, the water is discharged from the vessel 103 by the outlet duct 127 provided at the bottom of the reactor 101 and which is temporary closed during the treatment by the tap 111.

In the case where an insoluble anode is used, such as those containing or made of palladium, platinum, columbium, graphite or a combination thereof, the catalyst is produced "in situ" by introducing at least one catalyst salt inside the vessel, which is "activated" and solubilized by electrolysis. The catalyst salt may be a metallic salt of, as a way of example, vanadium, manganese, iron salts, but aluminum salts are preferred and more particularly, $Al_2(SO_4)_3$, $Al(NO_3)_3$ and $Al_2(SO_3)_3$. Such a catalyst salt is preferably introduced in the water to be purified prior to its introduction in the reactor at concentrations depending on the nature of the catalyst salt used and which may vary, by way of example, from 0,2 g/l to about 5 g/l. The precise concentration of each catalyst salt may readily be established by those skilled in the art to achieve the desired purifying effect.

The catalyst may also be produced using a soluble anode made of a catalytic precursor metal. Aluminum can be used as such metal but other metals may also be used such as magnesium, aluminum, titanium, zirconium or a combination thereof.

Under the effects of electrolysis, the metal is dissolved as a catalyst in the water to be purified. Therefore, the anodes must be periodically replaced after having been consumed.

When use is made of soluble anodes, it is advantageous to add to the water to be purified one or more conductive salts (e.g. NaCl, NaOH, KOH, etc.) to improve the electrolysis process.

Preferably, the catalyst is introduced both using a soluble anode and a catalyst salt. It may also be advantageous to generate the production of oxygen at the anode inside the reactor. Such can be achieved in the case of over potential and the so generated electrode can be used as oxidation reaction catalyst.

The degree of dissolution of metal and the rate of generation "in situ" of oxygen depend on different factors such as the potential applied at the electrodes, the composition of the water to be purified (pH, TDS, etc.), the pressure and the temperature inside the vessel of the reactor.

While passing through the reactor, the organic pollutants come into contact with a high oxidative environment comprising ozone gas, and a catalyst produced "in situ" inside the reactor by electrolysis. Moreover, some of the oxidation reactions are exothermic and therefore contribute to increase the temperature of the treated water, which may be desirable factor to raise the decomposition of organic pollutants.

In the case of over potential, the hydrogen produced at the cathode will be oxidized by ozone, thereby preventing any dangerous accumulation of hydrogen during any procedural steps.

The oxidation products that are so produced are mainly non-toxic, like $CO_2$. They are also easily removable. In the presence of catalyst and/or other suspended solids, some oxidation reaction products, more particularly radicals, tends to flocculate by attracting each others and form upon retention a distinct phase. Flocculation of these oxidation products may be accelerated by the addition of a flocculating agent, such as those of the anionic, anionic or cationic or polyelectrolytic types which are sold by chemical manufacturers such as Dow, Dupont, Ciba, Hoechst, Rohm & Hass, . . .

Of course, the choice of the catalyst may vary depending on the nature of the pollutants. Examples of catalysts that are well known in the art to be useful for the oxidation of water pollutant are as follows: $PdCl_2$—MgO—Cu, $Mn^{2+}$, Co, Bi Cu, CoCu, Ag, ZnO, Cu—Mn, V—Cu, Cu—Mn, VCu, $Co^{2+}$, UO—$MoO_3$—Cu, Ag, AgO, Mo, W, Ti, V, $V_2O_5$—$K_2SO_4$, Mo—V—P—Na, V—P and Mn—Co.

To accelerate recovery of the purified water, it is also advantageous to flow the treated water out of the reactor and stock it for a while into a retention tank to obtain formation of two distinctive phases, that is:

a first phase essentially consisting of flocculated oxidation products together with suspended products and catalyst; and another phase essentially consisting of purified water.

When a sufficient pressure is applied to the reactor, an upper phase of flocculated products is formed under the action of bubbles due to the differences of pressure between the reactor and the retention tank. The lower phase substantially consists of purified water.

The separation of these two phases is advantageously carried out by removal of the upper phase by means of a racking mechanism or an overflow weir. The sludge that is so produced is rich in organic compounds and may advantageously be recycled as, for example, a source of energy.

With very heavily contaminated water, the water may be processed through the reactor for more than one time.

EXAMPLE 1

The device that was used in this example for the purification of water was a prototype of a reactor as shown in FIG. 3. The step of removal of oxidation products from the treated water was performed by basic gravity filtration through filter paper. The vessel of the reactor was of a tubular type with an inner diameter of about 8 inches and an inner length of about 10 inches.

The electrochemical means consisted of five (5) metallic plates about 3 inches by about 5 inches, which were connected to a power supply. Three (3) plates made of stainless steel were connected to define the anode and the remaining two (2) plates, made of aluminum were connected to define the cathode. These plates were alternatively positioned so as to face each other and connected to an opposite pole such as defining four (4) consecutive electrolytic cells.

The power supply was delivering a current of few milliamps at about 10–15 volts. The ozone-containing gas was a mixture of air containing of about 1–3% by weight of ozone.

The gas mixture was injected in the reactor with a pump delivering about 20 cfh (cube feet per hours). $Al2(SO_4)3$ was then added in a concentration of about (0,7 g/l) as a catalyst precursor of oxidation reactions.

An aqueous solution of about 4 liters of a tea infusion containing about 65 ppm of tannin was charged at about room temperature and pressure in the reactor.

After about 20 mn of treatment the solution was removed from the reactor. A filtration was then carried out using a filter paper having a 10 micron porosity. Colorless and transparent water is obtained. The content of tannin in the treated water was then measured using a tannin colorimetric test sold by the firm HACH.

Adjunction of some flocculating agent Anionic 735 was also made to achieve immediate separation of two distinctive phases (i.e. a colorless and transparent one and a brown flocculated one).

A comparative test was carry out under the same conditions but without any electrochemical means and the results of the main test and this comparative test are listed below in Table I:

TABLE I

| | Tannin concentration | | | | |
|---|---|---|---|---|---|
| | Before Treat-Ment | After Treat-ment | Colour of the solution | After treatment and addition of a flocculating agent | Yield |
| Solution treated according to the invention | About 65 mg/l | About 3 mg/l | Transparent colourless | Immediate separation of a colourless and a transparent liquid | 96.92% |
| Solution treated without any electro-chemical means. (Only Ozone) | About 65 mg/l | About 15 mg/l | Light brown | Separation of a clear but yellow liquid | 76.92% |

EXAMPLE 2

The device that was used in this example for the purification of water comprised a reactor of the type shown in FIGS. 1 and 2.

The vessel of the reactor was of a tubular type with a diameter of about 8 inches and a length of about 6 feet.

The electrochemical means were of the type shown in FIGS. 1 and 2. They consisted of a plurality of (5) metallic rods and supply ducts provided through the reactor and connected to a power supply delivering a current of 3 A under a voltage of about 5 to 240V. The rods were made of aluminum and were connected to define the anodes. The ozone-containing gas supply ducts were made of stainless steel and connected to define the cathodes. The ozone-containing gas was a mixture air/ozone containing about 3 % by weight of ozone. This gas mixture was injected in the reactor with a pump delivering about 20 cfh (cubic feet per hours).

Black and heavily polluted laundry water containing mainly oil and greases was injected by a pump at a rate of 1,5 gallon/min (about 8 cfh) into the reactor. $Al_2SO_4$ was added to the polluted water as a catalyst precursor of oxidation reactions at a concentration of about (0,2 mg/l).

A comparative test was also carried out in the same conditions but without adjunction of ozone. The results of the main test and the comparative tests are given hereinafter in Table II:

TABLE II

| | Apparition of a flocculating phase | |
|---|---|---|
| Time (minutes) | with adjunction of ozone | without ozone |
| 0 | No | No |
| 5 | No | No |
| 10 | No/yes | No |
| 15 | Yes | No |
| 20 | Yes | No |
| 25 | Yes | No |
| 30 | Yes | No/yes |
| 35 | Yes | Yes |

Thus, the results of the experiments clearly demonstrate the efficiency of the device and method of the invention, which enhance in an unexpected manner the destruction of pollutants in addition of allowing easier recuperation of the purified water.

Of course, numerous modifications could be made to the preferred embodiments disclosed hereinabove without departing from the scope of invention as defined in the appended claims.

What is claimed is:

1. A device for the purification of polluted water by oxidation in situ of organic contaminants contained therein, said device comprising:

(a) at least one reactor, said reactor comprising in combination:
a vessel;
at least one inlet means for introducing a flow of said water to be purified in the vessel;
at least one outlet means for recovering the treated water from the vessel;
duct means for introducing an ozone-containing gas inside the vessel; and
electrochemical means for promoting conversion, inside the reactor, of at least one catalyst precursor into a catalyst of oxidation reaction, said electrochemical means comprising at least one pair of electrodes including a cathode and an anode;

(b) a supply of ozone-containing gas connected to the duct means;

(c) a power supply connected to the electrodes for generating therebetween an over potential so as to produce oxygen at the anode and hydrogen at the cathode and thus to promote oxidation of the organic contaminants into $CO_2$ in addition to promoting said conversion of said at least one catalyst precursor;

(d) means for allowing any gas overpressure to exit the vessel;

(e) turbulence means for redirecting and temporary retaining the flow of water to be purified within the vessel in order to increase the pathway of the polluted water in the reactor and thus the duration and efficiency of the purification; and (f) means for removing oxidation products from water after treatment within the vessel.

2. The device according to claim 1, wherein said duct means used for introducing the ozone-containing gas inside the vessel is made of an electrically conductive material and is connected to the power supply in order to form the cathode of the electrochemical means.

3. The device according to claim 2, wherein said duct means forming the cathode comprises a plurality of supply pipes extending along said vessel and provided with apertures through which ozone may be injected into the polluted water.

4. The device according to claim 3, wherein the supply pipes are arranged in concentric circles and the anode of the electrochemical means comprises a plurality of bars made of an electrically conductive material and arranged in concentric circles relative to the supply pipes inside the vessel.

5. The device according to claim 1, wherein the anode is essentially made of said at least one catalyst precursor which is selected to become solubilized in the water to be purified during the electrolysis reaction.

6. The device according to claim 5, wherein the anode is made of a metal selected from the group consisting of magnesium, aluminum, titanium, zirconium, combinations thereof and alloys containing them.

7. The device according to claim 1, wherein said turbulence means comprises corrugations provided on internal surfaces of said vessel for redirecting the flow of water to be purified inside the reactor.

8. The device according to claim 7, wherein said turbulence means also comprises baffles extending transversally within the vessel for increasing the pathway.

9. The device according to claim 1, wherein said means for removing the oxidation products from the water after treatment comprises a retention tank.

10. The device according to claim 8, wherein said means for removing of oxidation products also comprises at least one filtration apparatus.

11. The device according to claim 1, wherein the anode is made of an insoluble material selected from the group consisting of palladium, platinum, columbium, graphite and combinations thereof and is devised to produce in situ said at least one catalyst by electrolysis of a corresponding salt introduced into the vessel.

12. A method for the purification of a pollutants-containing water by oxidation of the pollutants into oxidation products and removal of the oxidation products, said method comprising the steps of:

(i) processing the pollutants-containing water in a device as claimed in claim 1; and (ii) removing the oxidation products from the treated water.

13. The method according to claim 12 wherein steps (i) and (ii) are successively carried out more than one time and said method comprises the additional step of (iii) filtering the purified phase trough a filter.

14. The method according to claim 13, wherein a flocculating agent is introduced into the water during any one of steps (i), (ii) and (iii).

15. A device for the purification of polluted water by oxidation in situ of organic contaminants contained therein, said device comprising:

(a) at least one reactor, said reactor comprising in combination:
a vessel;
at least one inlet means for introducing am flow of said water to be purified in the vessel;
at least one outlet means for recovering the treated water from the vessel;
duct means for introducing an ozone-containing gas inside the vessel; and
electrochemical means for promoting conversion, inside the reactor, of at least one catalyst precursor into a catalyst of oxidation reaction, said electrochemical means comprising at least one pair of electrodes including a cathode and an anode;

(b) a supply of ozone-containing gas connected to the duct means;

(c) a power supply connected to the electrodes for generating therebetween an over potential so as to produce oxygen at the anode and hydrogen at the cathode and thus to promote oxidation of the organic contaminants into $CO_2$ in addition to promoting said conversion of said at least one catalyst precursor;

(d) means for allowing any gas overpressure to exit the vessel;

(e) turbulence means within the vessel, said turbulence means comprising corrugations provided on internal surfaces of said vessel for redirecting the flow of water to be purified inside the reactor, said turbulence also comprising baffles extending transversally within the vessel, for increasing the pathway of the polluted water in the reactor and thus the duration and efficiency of the purification;

(f) means for removing oxidation products from water after treatment within the vessel, said means for removing the oxidation products comprising a retention tank and at least one filtration apparatus, wherein said duct means used for introducing the ozone-containing gas inside the vessel is made of an electrically conductive material and is connected to the power supply in order to form the cathode of the electrochemical means.

16. A method for the purification of a pollutants-containing water comprising at least one conductive salt, by oxidation of said pollutants into oxidation products and removal of said oxidation products, said method comprising the steps of:

(i) processing the pollutants-containing water into a device as claimed in claim 15; and (ii) removing the oxidation products from the processed water by retention to obtain a purified phase of water and at least one other phase of the purified phase from the at least one other phase.

* * * * *